(12) United States Patent
Chiang et al.

(10) Patent No.: US 11,586,105 B1
(45) Date of Patent: Feb. 21, 2023

(54) HEAD-UP DISPLAY AND OPTICAL REFLECTION STRUCTURE

(71) Applicants: Interface Technology (ChengDu) Co., Ltd., Sichuan (CN); Interface Optoelectronics (ShenZhen) Co., Ltd., Guangdong (CN); Interface Optoelectronics (Wuxi) Co., Ltd., Jiangsu (CN); General Interface Solution Limited, Miaoli County (TW)

(72) Inventors: Chewen Chiang, Guangdong (CN); I Chen Liu, Guangdong (CN)

(73) Assignees: Interface Technology (ChengDu) Co., Ltd., Sichuan (CN); Interface Optoelectronics (ShenZhen) Co., Ltd., Guangdong (CN); Interface Optoelectronics (Wuxi) Co., Ltd., Jiangsu (CN); General Interface Solution Limited, Miaoli County (TW)

( * ) Notice: Subject to any disclaimer, the term of this patent is extended or adjusted under 35 U.S.C. 154(b) by 0 days.

(21) Appl. No.: 17/804,310

(22) Filed: May 27, 2022

(30) Foreign Application Priority Data

Apr. 19, 2022 (CN) .......................... 202210409995.1

(51) Int. Cl.
*G03B 21/28* (2006.01)
*G02B 27/01* (2006.01)

(52) U.S. Cl.
CPC ............. *G03B 21/28* (2013.01); *G02B 27/01* (2013.01); *G02B 27/0101* (2013.01); *G02B 27/0149* (2013.01)

(58) Field of Classification Search
CPC ................ G02B 27/01; G02B 27/0101; G02B 27/0149; G03B 21/28
See application file for complete search history.

(56) References Cited

U.S. PATENT DOCUMENTS

| 2006/0044297 A1* | 3/2006 | Furukawa | ............ H04N 9/3129 348/E9.026 |
| 2006/0285078 A1* | 12/2006 | Kasazumi | .............. G03B 21/28 348/E9.026 |
| 2022/0026712 A1* | 1/2022 | Nambara | ............... B60K 35/00 |

* cited by examiner

*Primary Examiner* — Brent D Castiaux
(74) *Attorney, Agent, or Firm* — CKC & Partners Co., LLC (57) ABSTRACT

A head-up display includes a picture generation unit configured to project image light, a hexagonal optical reflection element arranged on a light path of the image light and including a hollow hexagonal cylinder, a concave mirror and an image display plate. The hollow hexagonal cylinder has a first sidewall, a second sidewall, a third sidewall, a fourth sidewall, a fifth sidewall and a sixth sidewall which are sequentially connected to form a closed hexagonal column. The second sidewall is transparent, and the first sidewall and the fifth sidewall opposite to the second sidewall are configured to reflect the image light. The concave mirror is disposed on the light path of the image light and configured to receive the image light reflected from the hollow hexagonal cylinder. The image display plate is configured to receive image light reflected from the concave mirror.

20 Claims, 6 Drawing Sheets

HEAD-UP DISPLAY AND OPTICAL REFLECTION STRUCTURE

RELATED APPLICATIONS

This application claims priority to China Application Serial Number 202210409995.1, filed Apr. 19, 2022, which is herein incorporated by reference in its entirety.

BACKGROUND

Field of Invention

The present disclosure relates to head-up displays and optical reflection structure.

Description of Related Art

In field of aviation, a head-up display can be used to project flight information to the front of the windshield, so that pilots can confirm the flight information without looking down at panels so as to avoid distraction and affect flight safety. In field of automotive, information such as vehicle speed, rotational speed, remaining fuel level, and navigation can be projected onto the windshield by setting a head-up display, so that drivers can confirm the information required for driving without diverting their eyes.

However, most of the current head-up displays only correspond to one specific display specifications. For example, a distance between the image of the head-up display and its user is limited, or the image of the head-up display has only a single magnification.

SUMMARY

An aspect of the present disclosure is related to a head-up display.

According to one or more embodiments of the present disclosure, a head-up display includes a picture generation unit, a hexagonal optical reflection element, a concave mirror and an image display plate. The picture generation unit is configured to project image light. The hexagonal optical reflection element is arranged on a light path of the image light. The hexagonal optical reflection element includes a hollow hexagonal cylinder. The hollow hexagonal cylinder has a first sidewall, a second sidewall, a third sidewall, a fourth sidewall, a fifth sidewall and a sixth sidewall which are sequentially connected to form a closed hexagonal column. The second sidewall is transparent. The first sidewall and the fifth sidewall opposite to the second sidewall are configured to reflect the image light. The concave mirror is disposed on the light path of the image light and configured to receive the image light reflected from the hollow hexagonal cylinder. The image display plate is configured to receive image light reflected from the concave mirror.

In one or more exemplary embodiments of the present disclosure, the hollow hexagonal cylinder of the hexagonal optical reflection element is configured to rotate between a first position and a second position. When the hollow hexagonal cylinder is at the first position, the first sidewall is aligned with the light path of the image light. When the hollow hexagonal cylinder is at the second position, the second sidewall and the fifth sidewall are aligned with the light path of the image light.

In one or more exemplary embodiments of the present disclosure, the hexagonal optical reflection element further includes a half-wave plate located between the second sidewall and the fifth sidewall.

In one or more exemplary embodiments of the present disclosure, the hexagonal optical reflection element further includes a quarter-wave plate and a reflective polarizer. The quarter-wave plate is located between the second sidewall and the fifth sidewall. The reflective polarizer is formed on the second sidewall.

In one or more exemplary embodiments of the present disclosure, the third sidewall is transparent, and the sixth sidewall opposite to the third sidewall and connected to the first sidewall is configured to reflect the image light. The hollow hexagonal cylinder of the hexagonal optical reflection element is configured to rotate between a first position, a second position and a third position. When the hollow hexagonal cylinder is at the first position, the first sidewall is aligned with the light path of the image light. When the hollow hexagonal cylinder is at the second position, the second sidewall and the fifth sidewall are aligned with the light path of the image light. When the hollow hexagonal cylinder is at the third position, the third sidewall and the sixth sidewall are aligned with the light path of the image light.

In some exemplary embodiments, the hexagonal optical reflection element further includes a half-wave plate, a quarter-wave plate and a reflective polarizer. The half-wave plate is located between the second sidewall and the fifth sidewall. The quarter-wave plate is located between the third sidewall and the sixth sidewall. The reflective polarizer is formed on the third sidewall.

In some exemplary embodiments, a distance between the half-wave plate and the fifth sidewall is less than a distance between the half-wave plate and the second sidewall. A distance between the quarter-wave plate and the third sidewall is less than a distance between the quarter-wave plate and the sixth sidewall.

In one or more exemplary embodiments of the present disclosure, the picture generation unit includes a linearly polarized light source.

In one or more embodiments of the present disclosure, the hexagonal optical reflection element further includes a polarizing beam splitter disposed on at least one of the first sidewall and the second sidewall.

In one or more exemplary embodiments of the present disclosure, the hexagonal optical reflection element further includes a reflection mirror disposed on the first sidewall of the hollow hexagonal cylinder and having a reflective curved surface protruding from the first sidewall.

In one or more exemplary embodiments of the present disclosure, the first sidewall, the second sidewall, the third sidewall, the fourth sidewall, the fifth sidewall and the sixth sidewall form an accommodating space. The hexagonal optical reflection element further includes a reflection mirror located in the accommodating space and disposed on the fifth sidewall. The reflection mirror has a reflective curved surface protruding toward the second sidewall.

In one or more exemplary embodiments of the present disclosure, the closed hexagonal column is a regular hexagon over a plane which is perpendicular to the first sidewall, the second sidewall, the third sidewall, the fourth sidewall, the fifth sidewall and the sixth sidewall.

In one or more exemplary embodiments of the present disclosure, the hexagonal optical reflection element further includes an electronically controlled rotating mechanism having a rotating shaft. The hollow hexagonal cylinder is fixed on the electronically controlled rotating mechanism.

The rotating shaft of the electronically controlled rotating mechanism is aligned with an axis of the hollow hexagonal cylinder.

In one or more exemplary embodiments of the present disclosure, the image display plate is transparent.

An aspect of the present disclosure is related to an optical reflection structure.

According to one or more embodiments of the present disclosure, an optical reflection structure includes a plurality of sidewalls connected to each other to form a closed hollow cylinder. A number of the sidewalls is an even number. The sidewalls include a first sidewall, a second sidewall, a third sidewall, a fourth sidewall and a fifth sidewall. The first sidewall has an optical reflection surface. The second sidewall is connected to the first sidewall and has a first optical transmission surface. The third sidewall is connected to the second sidewall and has a second optical transmission surface. The fourth sidewall is parallel to the second sidewall. The fourth sidewall has a first optical reflection surface aligned with the second sidewall in the closed hollow cylinder. The fifth sidewall is parallel to the third sidewall. The fifth sidewall has a second optical reflection surface aligned with the third sidewall in the closed hollow cylinder.

In one or more exemplary embodiments of the present disclosure, the optical reflection structure further includes a half-wave plate, a quarter-wave plate and a reflective polarizer. The half-wave plate is located between the second sidewall and the fourth sidewall. The quarter-wave plate is located between the third sidewall and the fifth sidewall. The reflective polarizer is formed on the third sidewall.

In some embodiments, a distance between the half-wave plate and the fourth sidewall is less than a distance between the half-wave plate and the second sidewall. A distance between the quarter-wave plate and the third sidewall is less than a distance between the quarter-wave plate and the fifth sidewall.

In one or more embodiments of the present disclosure, the optical reflection structure further includes a polarizing beam splitter disposed on at least one of the sidewalls.

In one or more embodiments of the present disclosure, the optical reflection structure further includes an electronically controlled rotating mechanism having a rotating shaft. The closed hollow cylinder is fixed on the electronically controlled rotating mechanism. The rotating shaft of the electronically controlled rotating mechanism is aligned with an axis of the closed hollow cylinder.

In one or more embodiments of the present disclosure, the closed hollow cylinder is a closed regular polygon on a plane perpendicular to the sidewalls.

In summary, by using hexagonal optical reflection structures or other even-numbered-sidewalls optical reflection structures, three or more light path changes can be realized. A head-up display with a hexagonal optical reflection structure or an even-numbered-sidewalls optical reflection structure can be directly rotated by an electrical control or mechanical tool to realize three different light path structures and meet different needs of display.

It is to be understood that both the foregoing general description and the following detailed description are by examples, and are intended to provide further explanation of the disclosure as claimed.

BRIEF DESCRIPTION OF THE DRAWINGS

The advantages of the present disclosure are to be understood by the following exemplary embodiments and with reference to the attached drawings. The illustrations of the drawings are merely exemplary embodiments and are not to be considered as limiting the scope of the disclosure.

DETAILED DESCRIPTION

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations. Also, the same labels may be regarded as the corresponding components in the different drawings unless otherwise indicated. The drawings are drawn to clearly illustrate the connection between the various components in the embodiments, and are not intended to depict the actual sizes of the components.

In addition, terms used in the specification and the claims generally have the usual meaning as used in the field, in the context of the invention and in the context of the particular content unless particularly specified. Some terms used to describe the invention are to be discussed below or elsewhere in the specification to provide additional guidance related to the description of the invention to specialists in the art.

The phrases "first," "second," etc., are solely used to separate the descriptions of elements or operations with the same technical terms, and are not intended to convey a meaning of order or to limit the invention.

Additionally, the phrases "comprising," "includes," "provided," and the like, are all open-ended terms, i.e., meaning including but not limited to.

Further, as used herein, "a" and "the" can generally refer to one or more unless the context particularly specifies otherwise. It will be further understood that the phrases "comprising," "includes," "provided," and the like used herein indicate the stated characterization, region, integer, step, operation, element and/or component, and does not exclude additional one or more other characterizations, regions, integers, steps, operations, elements, components and/or groups thereof.

In order to provide multiple display modes in a head-up display, the present disclosure provides hexagonal optical reflection elements or even-numbered-sidewalls optical reflection elements. One of these hexagonal optical reflection elements or even-numbered-sidewalls optically reflection elements are provided in one head-up display device. By electronically rotating the hexagonal optical reflection element or even-numbered-sidewalls optical reflection elements, a distance of a light path of the image light in the head-up display can be changed so as to provide a variety of display modes with different magnifications, which is convenient for users to select.

Figure 1:
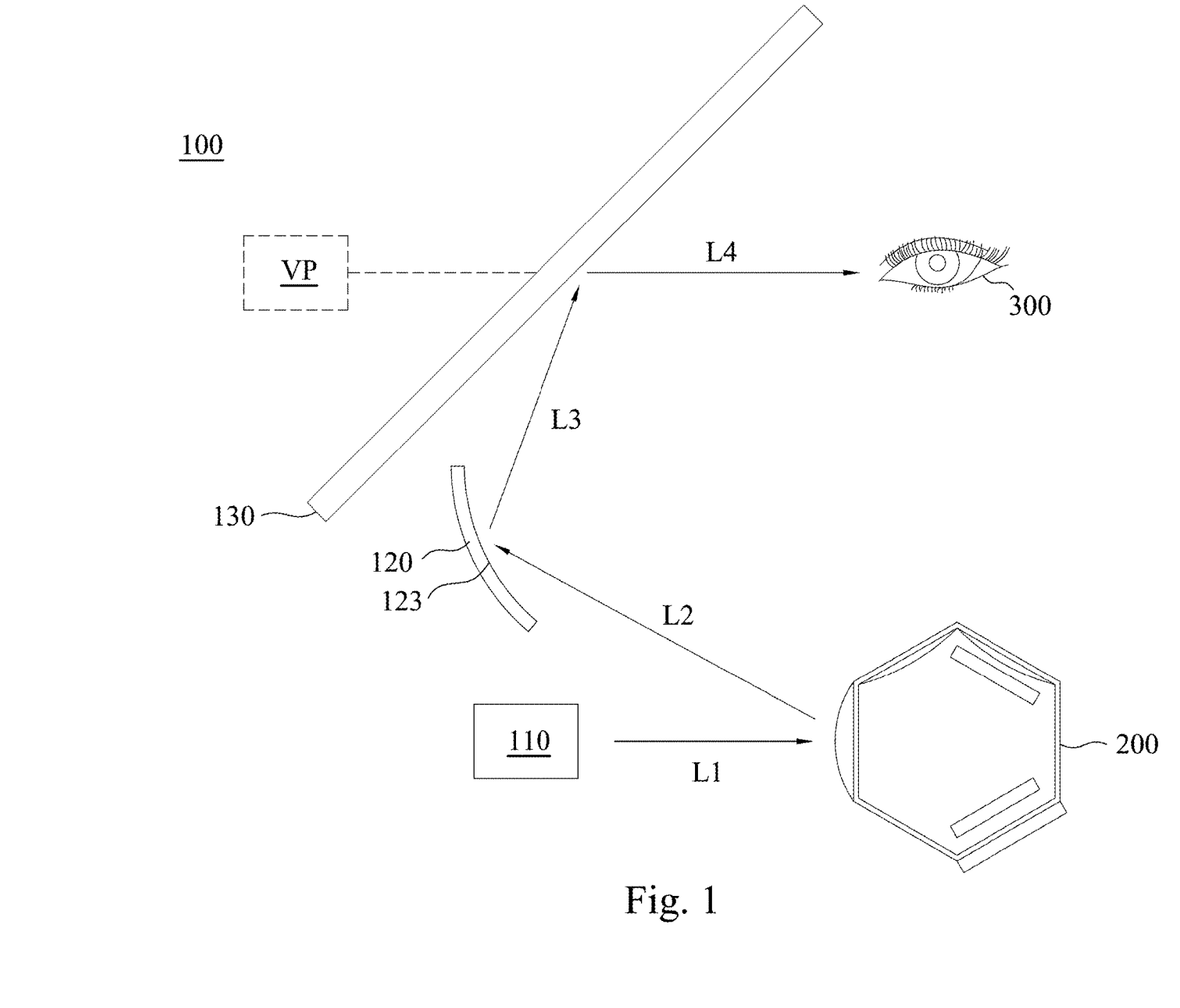
FIG. 1 illustrates a schematic diagram of a head-up display according to one embodiment of the present disclosure.

Reference is made by FIG. 1. FIG. 1 illustrates a schematic diagram of a head-up display 100 according to one embodiment of the present disclosure.

As shown in FIG. 1, in one or more embodiments of the present disclosure, the head-up display includes a picture generation unit 110, a hexagonal optical reflection element 200, a curved mirror 120 and an image display plate 130.

In FIG. 1, the picture generation unit 110 is configured to project image light toward the hexagonal optical reflection element 200. The image light corresponds to the light L1. The image light may correspond to a virtual image VP, and the virtual image VP may contain information required by one or more users of the head-up display 100. After the light L1 is received by the hexagonal optical reflection element 200, the light L1 is reflected as light L2 to the curved mirror 120. The curved mirror 120 has a concave curved surface 123. After the light L2 is received by the concave curved surface 123 of the curved mirror 120, the light L3 is reflected to the image display plate 130. The light L3 is reflected by the concave curved surface 123 of the curved mirror 120, which can enlarge the virtual image VP for subsequent imaging. Subsequently, the light L3 is received by the image display plate 130, and the image display plate 130 reflects the light L4 to the visual field 300 of the user. Then, on the extended dotted line of the light L4, a virtual image VP having the same height as a visual field 300 of the user is formed behind the image display plate 130.

In some embodiments, the user of the head-up display 100 does not need to look down and change the visual field 300 to watch the picture generation unit 110 that generates the virtual image VP but can directly view the virtual image VP on the image display plate 130 to obtain relevant information.

In some exemplary embodiments, for example, the head-up display 100 is installed on a vehicle, the image display plate 130 corresponds to a windshield of the vehicle, and the user is the driver of the vehicle. As such, the driver does not need to look down at the panels of the vehicle and change his visual field 300, and the desired information can be directly obtained from the image display plate 130 of the vehicle. In some embodiments, the image display plate 130 is transparent, so that the user can also obtain the information behind the image display plate 130.

In this exemplary embodiment, the curved mirror 120 can be any suitable aspherical mirror, and an aberration of the virtual image VP can be corrected according to optimization of a designer of the head-up display 100.

In some exemplary embodiments, the picture generation unit 110 includes a light source used for emitting image light and a processing device for generating a virtual image VP. In some embodiments, the processing device includes a computer, a mobile device remotely connected to a server or an image processing device connected to one or more function panels, but the disclosure is not limited thereto.

In some exemplary embodiments, a light source of the picture generation unit 110 includes a linearly polarized light source, so that the light L1 corresponding to the image light in FIG. 1 is linearly polarized light. The linearly polarized light is conducive to the transmission of image light and avoids being affected by ambient light from environments.

In one or more exemplary embodiments of the present disclosure, after the light L1 is received by the hexagonal optical reflection element 200, the light L1 can be processed by one or more optical elements on the hexagonal optical reflection element 200 to be reflected as the light L2. For example, one or more polarizing beam splitters, half-wave plates, quarter-wave plates or reflective polarizers may be disposed on the hexagonal optical reflection element 200. By rotating the hexagonal optical reflection element 200, the light L1 can go through different light path structures, so that the magnification of the virtual image VP can be adjusted.

In this embodiment, the hexagonal optical reflection element 200 includes three different sets of light path structures. When three sets of different light path structures are activated to the hexagonal optical reflection element 200, the hexagonal optical reflection element 200 is correspondingly rotated, so that different sidewalls of the hexagonal optical reflection element 200 can be aligned with the light L1.

In some exemplary embodiments, the light source of the picture generation unit 110 may include a liquid crystal display unit, a digital light processing display unit, a liquid crystal display unit on silicon, or a polymer dispersed liquid crystal display unit.

Figure 2:
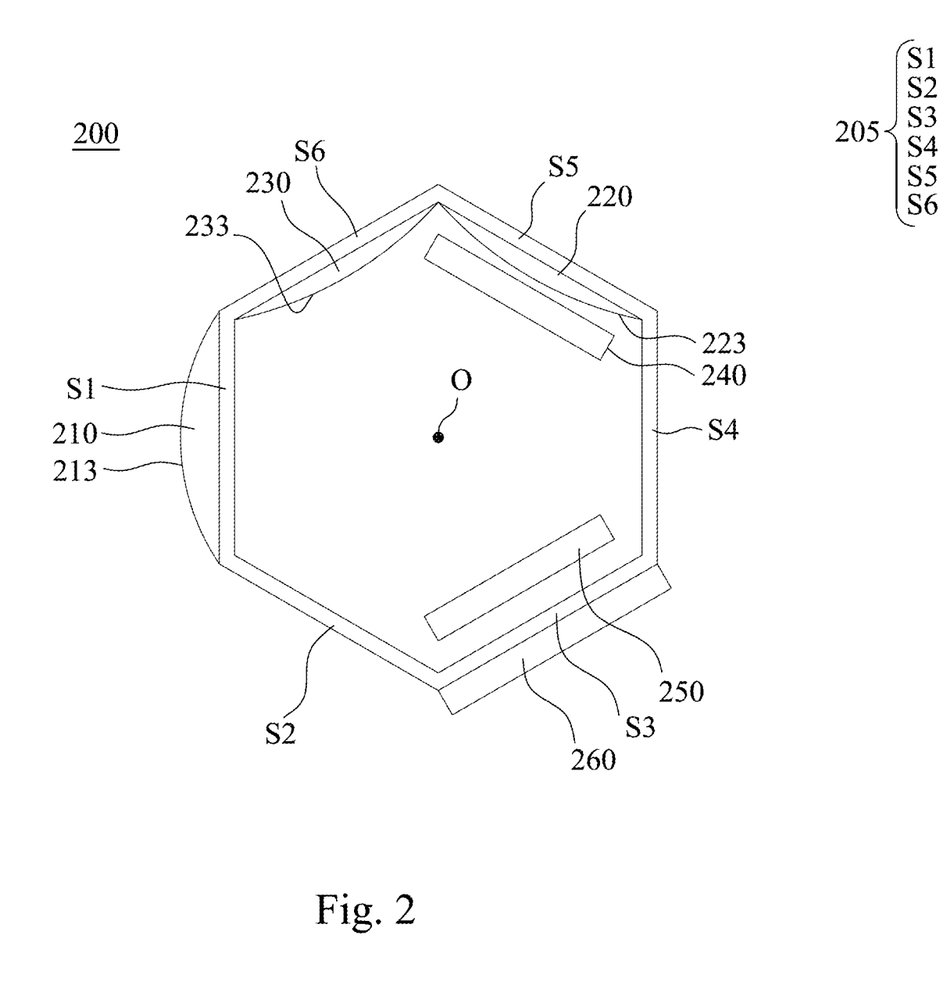
FIG. 2 illustrates a side view of a hexagonal optical reflection element according to one embodiment of the present disclosure.

Reference is made by FIG. 2 to further illustrate a specific structure of the hexagonal optical reflection element 200. FIG. 2 illustrates a side view of a hexagonal optical reflection element 200 according to one embodiment of the present disclosure.

As shown in FIG. 2, in this exemplary embodiment, the hexagonal optical reflection element 200 includes a hollow hexagonal cylinder 205. The hollow hexagonal cylinder 205 has a first sidewall S1, a second sidewall S2, a third sidewall S3, a fourth sidewall S4, a fifth sidewall S5 and a sixth sidewall S6 connected in sequence, and the sixth sidewall S6 is connected with the first sidewall S1. In other words, the first sidewall S1, the second sidewall S2, the third sidewall S3, the fourth sidewall S4, the fifth sidewall S5 and the sixth sidewall S6 are connected to form a closed hexagonal column. The hollow hexagonal cylinder 205 has an axis O.

FIG. 2 illustrates a cross-section of the hexagonal optical reflection element 200 on a plane perpendicular to the first sidewall S1, the second sidewall S2, the third sidewall S3, the fourth sidewall S4, the fifth sidewall S5 and the sixth sidewall S6. As shown in the cross-section shown in FIG. 2, in this embodiment, the first sidewall S1, the second sidewall S2, the third sidewall S3, the fourth sidewall S4, the fifth sidewall S5 and the sixth sidewall S6 are connected to form a closure hexagonal column, and the closed hexagonal column is a regular hexagon on the cross-section view shown in FIG. 2.

Therefore, in this embodiment, the first sidewall S1 is opposite to the fourth sidewall S4, and the first sidewall S1 is parallel to the fourth sidewall S4. Similarly, the second sidewall S2 is opposite to and parallel to the fifth sidewall S5, and the third sidewall S3 is opposite to and parallel to the sixth sidewall S6.

In this embodiment, the first sidewall S1 is used for directly reflecting the light L1. As shown in FIG. 2, in some embodiments of the present disclosure, a reflection mirror 210 is disposed on the first sidewall S1, and the reflection mirror 210 has a reflective curved surface 213 that protrudes outward relative to the first sidewall S1. It should be noted that the shape of the reflective curved surface 213 shown in FIG. 2 is for illustration only and does not limit the present disclosure. For example, the reflective curved surface 213 may be a part of a spherical surface or a part of a parabolic mirror surface, but it is not limited thereto, and other suitable curved surface shape designs are also suitable for the reflective curved surface 213.

As such, once the first sidewall S1 of the hexagonal optical reflection element 200 is aligned with the picture generation unit 110 (as illustrated in FIG. 1), the light L1 can be reflected as the light L2 by the reflection mirror 210 on the first sidewall S1 and the light L2 is reflected to the curved mirror 120.

Furthermore, in this embodiment, the second sidewall S2 and the third sidewall S3 are used for the light L1 to penetrate, and the fifth sidewall S5 opposite to the second sidewall S2 and the sixth sidewall S6 opposite to the third sidewall S3 are used to reflect the light L1. As shown in FIG. 2, in this embodiment, a reflection mirror 220 is provided on the fifth sidewall S5, and a reflection mirror 230 is provided on the sixth sidewall S6.

In other words, once the second sidewall S2 is aligned with the picture generation unit 110, when the picture generation unit 110 projects the light L1 towards the hexagonal optical reflection element 200, the light L1 would penetrate the second sidewall S2 and reach the reflection mirror 220 on the fifth sidewall S5, the light L1 is reflected as the light L2 by a reflective curved surface 223 of the reflection mirror 220, and the reflected light L2 would pass through the second sidewall S2 and travel toward the curved mirror 120.

Similarly, once the third sidewall S3 is aligned with the picture generation unit 110, when the picture generation unit 110 projects the light L1 towards the hexagonal optical reflection element 200, the light L1 penetrates the third sidewall S3 and reach the reflection mirror 230 on the sixth sidewall S6 and the light L1 is reflected by a reflective curved surface 233 of the reflection mirror 230, so that the hexagonal optical reflection element 200 will reflect the light L2 to the curved mirror 120.

As shown in FIG. 2, in one or more exemplary embodiments of the present disclosure, the reflective curved surface 223 of the reflection mirror 220 on the fifth sidewall S5 is a convex curved surface protruding toward the second sidewall S2, and the reflective curved surface 233 of the reflection mirror 230 on the sixth sidewall S6 is a convex curved surface facing the second sidewall S2, the convex reflective curved surface 233 of the reflection mirror 230 on the sixth sidewall S6 protrudes towards the third sidewall S3. In some exemplary embodiments, the reflective curved surface 223 and the reflective curved surface 233 may be part of a spherical surface. In some exemplary embodiments, the reflective curved surface 223 and the reflective curved surface 233 can also be designed as aspherical surfaces, so that the subsequent virtual image VP (as illustrated in FIG. 1) can visually have different distance effects, e.g., different fields of vision for the user of the head-up display 100.

Return to FIG. 2. In this exemplary embodiment, the hollow hexagonal cylinder 205 of the hexagonal optical reflection element 200 is hollow. In other words, the first sidewall S1, the second sidewall S2, the third sidewall S3, the fourth sidewall S4, the fifth sidewall S5 and the sixth sidewall S6 of the hollow hexagonal cylinder 205 form an accommodating space, and the reflection mirror 220 on the fifth sidewall S5 and the reflection mirror 230 on the sixth sidewall S6 are disposed in the accommodating space inside the hollow hexagonal cylinder 205.

Further, as shown in FIG. 2, the hexagonal optical reflection element 200 further includes a half-wave plate 240. The half-wave plate 240 is disposed inside the hollow hexagonal cylinder 205, and the half-wave plate 240 is located between the second sidewall S2 and the fifth sidewall S5. In this way, when the light L1 passes through the second sidewall S2 and enters the hollow hexagonal cylinder 205, the light L1 would pass through the half-wave plate 240 and then be received by the reflection mirror 220 on the fifth sidewall S5. The light L2 reflected by the reflection mirror 220 would also pass through the half-wave plate 240 once again, and then the light L2 passes through the second sidewall S2 and leave the hollow hexagonal cylinder 205.

Similarly, as shown in FIG. 2, the hexagonal optical reflection element 200 further includes a quarter-wave plate 250. The quarter-wave plate 250 is disposed inside the hollow hexagonal cylinder 205, and the quarter-wave plate 250 is located between the third sidewall S3 and the sixth sidewall S6. In addition, a reflective polarizer 260 is further disposed on the third sidewall S3. When the linearly polarized light L1 passes through the third sidewall S3 and enters the hollow hexagonal cylinder 205, the light L1 would pass through the quarter-wave plate 250 before the transmission light L1 is received by the reflection mirror 230 on the sixth sidewall S6. However, the light reflected by the reflection mirror 230 on the sixth sidewall S6 would pass through the quarter-wave plate 250 one more time, and it makes the reflected light reaching the third sidewall S3 be P-polarized. Since the reflective polarizer 260 is provided on the third sidewall S3, the P-polarized reflected light would be reflected back to the interior of the hollow hexagonal cylinder 205 by the reflective polarizer 260. The light reflected inside the hollow hexagonal cylinder 205 exits the hollow hexagonal cylinder 205 after the light pass through the quarter-wave plate 250 twice.

In summary, in this exemplary embodiment, when the linearly polarized light L1 (as illustrated in FIG. 1) provided by the picture generation unit 110 is received by the hexagonal optical reflection element 200, the light L2 reflected by the hexagonal optical reflection element 200 is able to pass three different light paths with different light path length. For the three light path can be provided by the hexagonal optical reflection element 200, a light path with a shortest light path length is provided when the first sidewall S1 of the hexagonal optical reflection element 200 is aligned with the picture generation unit 110, a light path with medium light path length is provided when the second sidewall S2 of the hexagonal optical reflection element 200 is aligned with the picture generation unit 110, and a light path with greatest light path length is provided when the second sidewall S2 of the hexagonal optical reflection element 200 is aligned with the picture generation unit 110. The greater the light path length, the greater the magnification of the virtual image VP. In addition, by designing the surface curvatures of the reflective curved surface 213, the reflective curved surface 223 and the reflective curved surface 233, a virtual image distance between the visual field 300 of the user and the virtual image VP and the viewing angle of the virtual image VP relative to visual field 300 of the user can be further adjusted, so as to adjust the visual effect with different fields of vision of the virtual image VP for the user.

In this exemplary embodiment, as shown in FIG. 2, a distance between the half-wave plate 240 and the fifth sidewall S5 is less than a distance between the half-wave plate 240 and the second sidewall S2. A distance between the quarter-wave plate 250 and the third sidewall S3 is less than a distance between the quarter-wave plate 250 and the sixth sidewall S6. Accordingly, the half-wave plate 240 and the quarter-wave plate 250 would not be adjacent to the two substantially connected sidewalls, and it can be ensured that the half-wave plate 240 and the quarter-wave plate 250 can be substantially separated in space.

It should be noted that the hexagonal optical reflection element 200 shown in FIG. 2 is only an embodiment of the present disclosure, and the present disclosure should not be unduly limited by the embodiment.

For example, as shown in FIG. 2, in one or more embodiments of the present disclosure, the first sidewall S1, the second sidewall S2, the third sidewall S3, the fourth sidewall S4, the fifth sidewall S5 and the sixth sidewall S6 can be transparent, and then the reflection mirror 210, the reflection mirror 220 and the reflection mirror 230 are respectively formed on the first sidewall S1, the fifth sidewall S5 and the sixth sidewall S6 to realize that the light L1 penetrates the second sidewall S2 and the third sidewall S3, the light L1 enters the hollow hexagonal cylinder 205 and the light L1 can be reflected by the first sidewall S1, the fifth sidewall S5 and the sixth sidewall S6.

In some exemplary embodiments, the hollow hexagonal cylinder 205 can include a hexagonal column frame, and the first sidewall S1, the second sidewall S2, the third sidewall S3, the fourth sidewall S4, the fifth sidewall S5 and the sixth sidewall S6 are respectively disposed on the hexagonal column frame, wherein a materials of the second sidewall S2 and the third sidewall S3 are selective so that the light L1 is able to penetrate into the hollow hexagonal cylinder 205 and the first sidewall S1, the fifth sidewall S5 and the sixth sidewall S6 are directly configured as reflection mirrors.

In one or more embodiments of the present disclosure, the hexagonal optical reflection element 200 may further include one or more polarizing beam splitters. The polarizing beam splitter can be a coating film of elements disposed on the first sidewall S1, the second sidewall S2, the third sidewall S3, the fifth sidewall S5 and the sixth sidewall S6. For example, in FIG. 2, the reflective curved surface 213 of the mirror 210 on the first sidewall S1 can be further provided with a coating of a polarizing beam splitter to separate ambient light and linearly polarized light L1. In some embodiments, the second sidewall S2 and the third sidewall S3 for the light L1 to penetrate can be directly provided with a coating film of a polarizing beam splitter. In some embodiments, the reflective curved surface 223 of the reflection mirror 220 on the fifth sidewall S5 and the reflective curved surface 233 of the reflection mirror 230 on the sixth sidewall S6 may be further provided with coatings of polarizing beam splitters.

Reference is made by FIGS. 3-6 to further illustrates that how to enable different light path structures of the hexagonal optical reflection element 200.

It should be noted traveling directions of the light L1, the light L11, the light L12, and the light L2 shown in FIGS. 3-6 are for illustration only. After being reflected by the hexagonal optical reflection element 200, the reflected light L2 substantially travels toward the curved mirror 120 as shown in FIG. 1.

Figure 3:
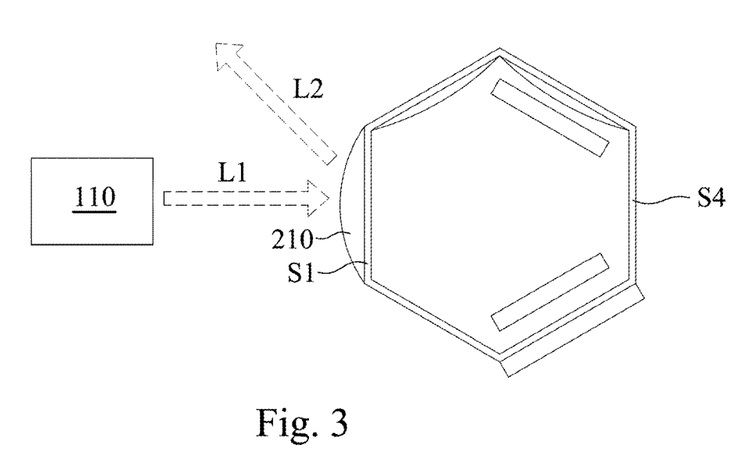
FIG. 3 is a schematic diagram illustrating a first light path of a hexagonal optical reflection element reflecting a light from a picture generation unit at a first position according to one embodiment of the present disclosure.

Reference is made by FIG. 3. FIG. 3 is a schematic diagram illustrating a first light path of a hexagonal optical reflection element 200 reflecting a light L1 from a picture generation unit 110 at a first position 205A (also refer to following FIG. 8) according to one embodiment of the present disclosure.

In this embodiment, the picture generation unit 110 includes a linearly polarized light source, and the picture generation unit 110 projects the S-polarized light L1 to the hexagonal optical reflection element 200, wherein the light L1 corresponds to the image light generated by the picture generation unit 110. In other words, when the hexagonal optical reflection element 200 is located at the first position 205A, the first sidewall S1 of the hollow hexagonal cylinder 205 of the hexagonal optical reflection element 200 is aligned with the light path of the light L1 corresponding to the image light.

As shown in FIG. 3, when the hexagonal optical reflection element 200 is located at the first position 205A, the first sidewall S1 of the hollow hexagonal cylinder 205 of the hexagonal optical reflection element 200 is aligned with the picture generation unit 110. The S-polarized light L1 is projected to the first sidewall S1 and the light L1 is directly reflected by the reflection mirror 210 on the first sidewall S1. Also referring to FIG. 1, when the hexagonal optical reflection element 200 is located at the first position 205A, the light L1 does not enter the hollow hexagonal cylinder 205, the reflection mirror 210 on the first sidewall S1 receives the light L1 and reflects the light L2 to the curved mirror 120.

Figure 4:
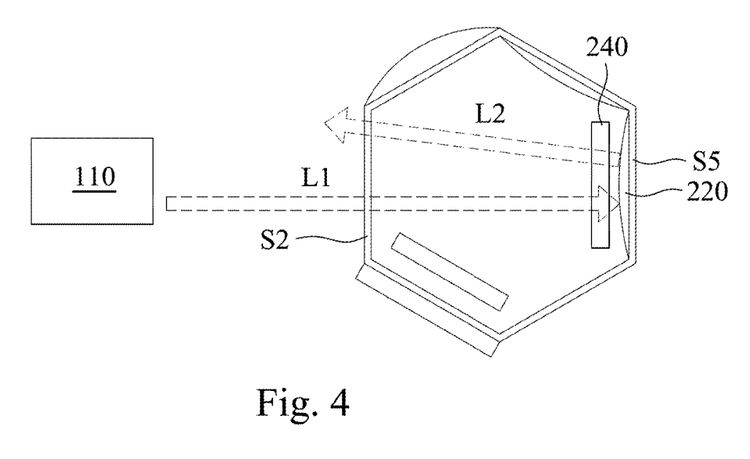
FIG. 4 is a schematic diagram illustrating a second light path of a hexagonal optical reflection element reflecting a light from a picture generation unit at a second position according to one embodiment of the present disclosure.

Reference is made by FIG. 4. FIG. 4 is a schematic diagram illustrating a second light path of a hexagonal optical reflection element 200 reflecting a light L1 from a picture generation unit 110 at a second position 205B (also refer to following FIG. 8) according to one embodiment of the present disclosure.

In this exemplary embodiment, the picture generation unit 110 includes a linearly polarized light source, and the picture generation unit 110 projects the S-polarized light L1 to the hexagonal optical reflection element 200, wherein the light L1 corresponds to the image light generated by the picture generation unit 110. In other words, when the hexagonal optical reflection element 200 is located at the second position 205B, the second sidewall S2 of the hollow hexagonal cylinder 205 of the hexagonal optical reflection element 200 is aligned with the light path of the light L1 corresponding to the image light.

As shown in FIG. 4, when the hexagonal optical reflection element 200 is located at the second position 205B, the second sidewall S2 of the hollow hexagonal cylinder 205 of the hexagonal optical reflection element 200 is aligned with the picture generation unit 110. The S-polarized light L1 is projected to the second sidewall S2. The light L1 penetrates the second sidewall S2 and enters the hollow hexagonal cylinder 205. The S-polarized light L1 passes through the half-wave plate 240 and is converted into P-polarization light.

In FIG. 4 and also referring to FIG. 1, the reflection mirror 220 on the fifth sidewall S5 receives the light L1 converted to P-polarization after passing through the half-wave plate 240 and reflects the light L2. The light L2 passes through the half-wave plate 240 and the second sidewall S2 in sequence. Then, the light L2 exits the hollow hexagonal cylinder 205 and travels toward the curved mirror 120.

Figure 5:
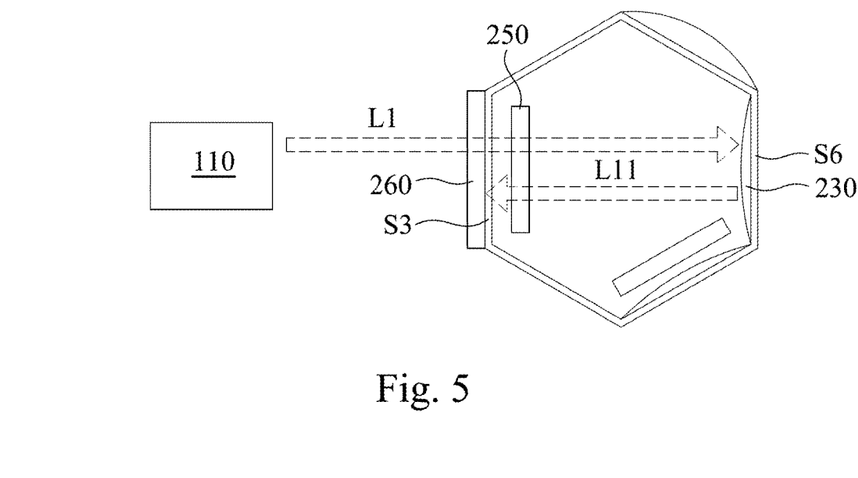
FIGS. 5 and 6 are schematic diagrams illustrating a third light path of a hexagonal optical reflection element reflecting a light from a picture generation unit at a third position according to one embodiment of the present disclosure.
Figure 6:
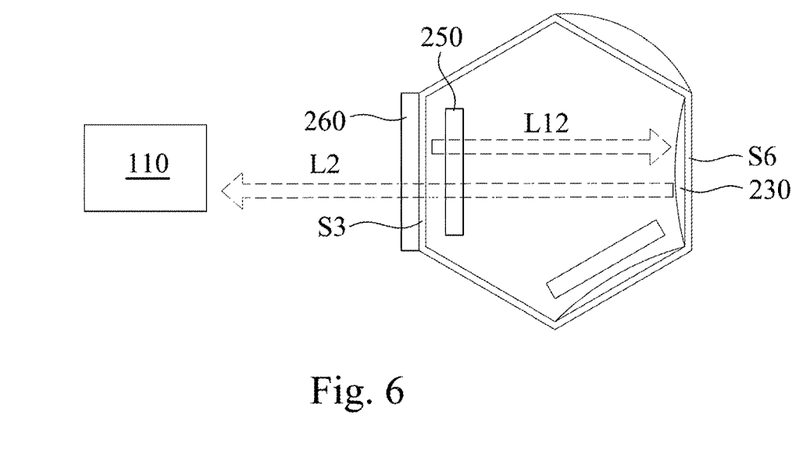

Reference is made by FIGS. 5 and 6. FIGS. 5 and 6 are schematic diagrams illustrating a third light path of a hexagonal optical reflection element 200 reflecting a light L1 from a picture generation unit 110 at a third position 205C (also refer to following FIG. 8) according to one embodiment of the present disclosure.

It should be noted that the traveling directions of the light L1, the light L11, the light L12, and the light L2 shown in FIGS. 5 and 6 are for illustration only. Referring to FIG. 1, after being reflected by the hexagonal optical reflection element 200, the reflected light L2 substantially travels toward the curved mirror 120.

In this embodiment, the picture generation unit 110 includes a linearly polarized light source, and the picture generation unit 110 projects the S-polarized light L1 to the hexagonal optical reflection element 200, wherein the light L1 corresponds to the image light generated by the picture generation unit 110.

As shown in FIG. 5, when the hexagonal optical reflection element 200 is located at the third position 205C, the third sidewall S3 of the hollow hexagonal cylinder 205 of the hexagonal optical reflection element 200 is aligned with the picture generation unit 110. The S-polarized light L1 is projected to the third sidewall S3. The S-polarized light L1 sequentially penetrates the reflective polarizer 260, the third sidewall S3 and the quarter-wave plate 250 on the third sidewall S3 and is converted into left-handed polarization, and then the left-handed polarized light L1 reaches the reflection mirror 230 on the sixth sidewall S6.

The reflection mirror 230 reflects the left-handed polarized light L1 into a right-handed polarized light L11. The light L11 passes through the quarter-wave plate 250 and is converted into P-polarization light. Then, the P-polarized light L11 reaches the third sidewall S3. However, since the reflective polarizer 260 is configured on the third sidewall S3, the light L11 cannot exit the interior of the hollow hexagonal cylinder 205.

Continued with FIG. 5, in FIG. 6, since the light L11 reaching the third sidewall S3 is P-polarized, the P-polarized light L11 is reflected as light L12 by the reflective polarizer 260 disposed on the third sidewall S3. After the reflected light L12 passes through the quarter-wave plate 250, the light L12 is converted into a right-handed polarization light. Then, the right-handed polarized light L12 reaches the reflection mirror 230 on the sixth sidewall S6.

The reflection mirror 230 reflects the right-handed polarized light L12 into a left-handed light L2. After the left-handed light L2 passes through the quarter-wave plate 250, the light L2 is able to pass through the third sidewall S3 and the reflective polarizer 260 on the third sidewall S3 and exit the hollow hexagonal cylinder 205. Referring to FIG. 1, the light L2 exiting the hexagonal optical reflection element 200 travels toward the curved mirror 120.

Summarizing the above FIGS. 3-6, in this exemplary embodiment, when the light L1 is projected on the hexagonal optical reflection element 200 located at the first position 205A, the light L1 would not enter the hollow hexagonal cylinder 205 and the light L1 has a short light path length. When the light L1 is projected to the hexagonal optical reflection element 200 located at the second position 205B, the light L1 is reflected once inside the hollow hexagonal cylinder 205 and the light L1 has a medium light path length. When the light L1 is projected to the hexagonal optical reflection element 200 located at the third position 205C, the light L1 is reflected by the sixth sidewall S6 twice inside the hollow hexagonal cylinder 205 and the light L1 has a long light path length. The longer the light path length, the greater the magnification in which the head-up display 100 has.

In this embodiment, by rotating the hexagonal optical reflection element 200 relative to the axis O, the hexagonal optical reflection element 200 can be rotated between the first position 205A, the second position 205B and the third position 205C. For example, when the hexagonal optical reflection element 200 is located at the first position 205A, by rotating the hexagonal optical reflection element 200 clockwise by 60 degrees relative to the axis O, the hexagonal optical reflection element 200 can be rotated to the second position 205B. Similarly, when the hexagonal optical reflection element 200 is located at the second position 205B, the hexagonal optical reflection element 200 can be rotated to the third position 205C by rotating the hexagonal optical reflection element 200 clockwise with respect to the axis O by 60 degrees.

Figure 7:
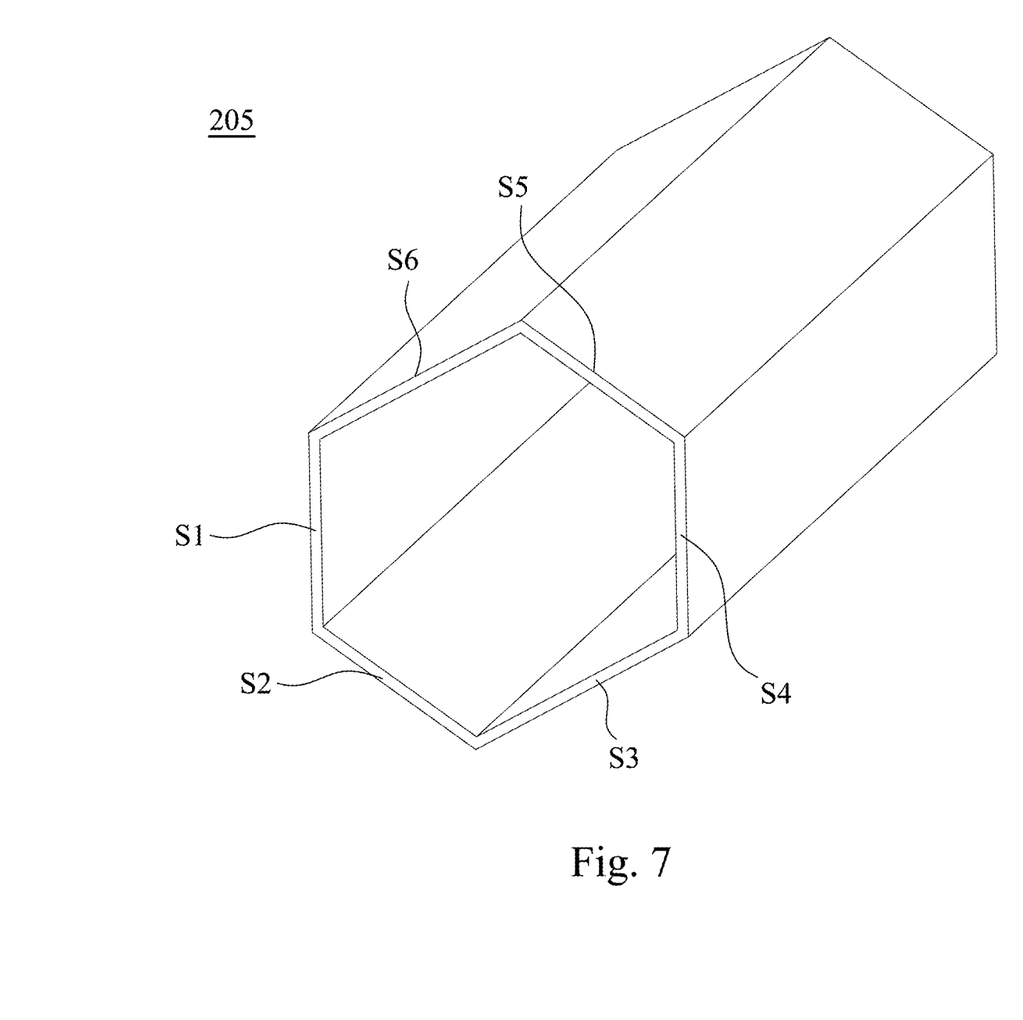
FIG. 7 illustrates a perspective view of a hollow hexagonal cylinder of a hexagonal optical reflection element according to one embodiment of the present disclosure.
Figure 8:
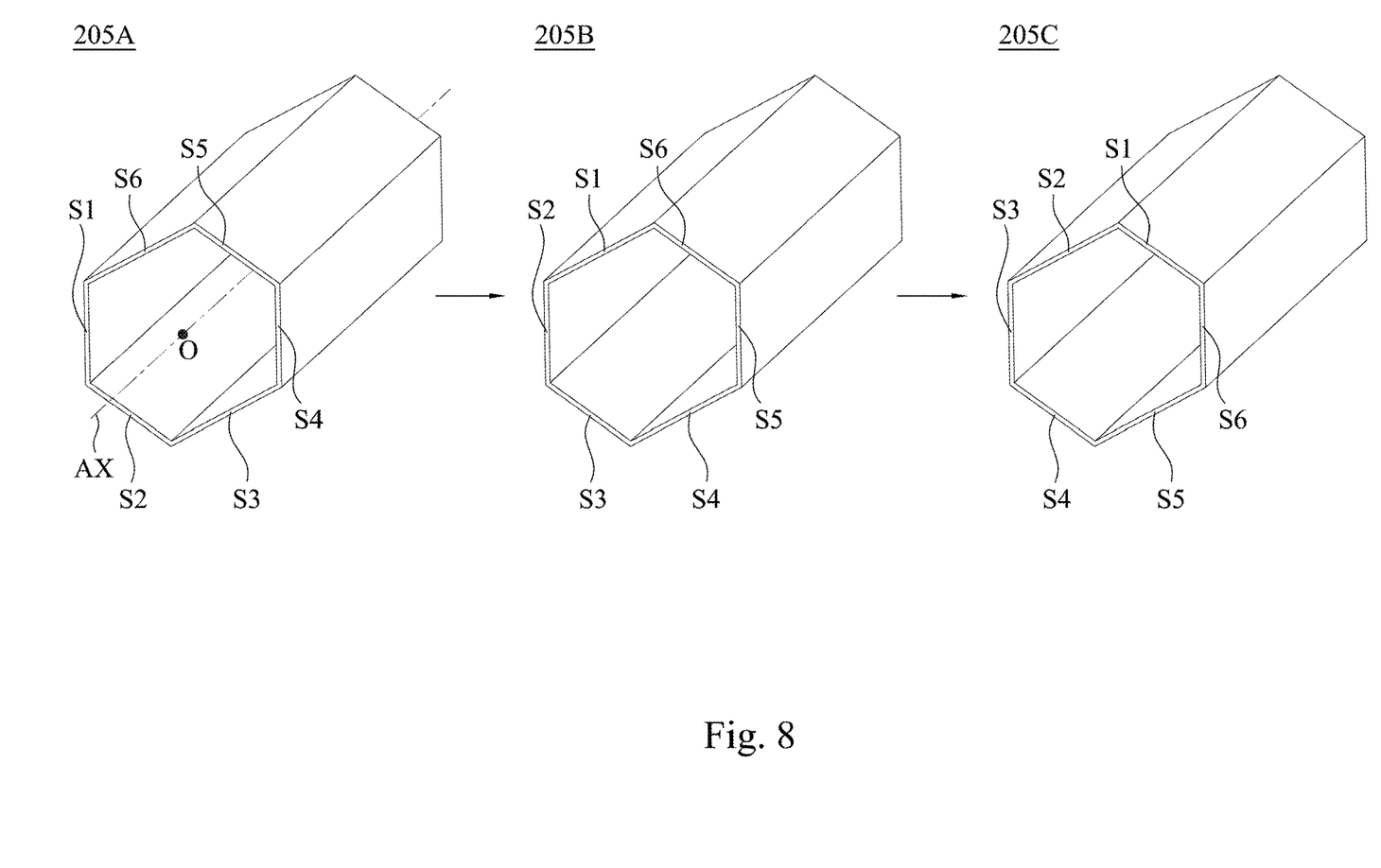
FIG. 8 illustrates a schematic diagram illustrating the rotation of the hollow hexagonal cylinder of the hexagonal optical reflection element to the first position, the second position and the third position according to one embodiment of the present disclosure.

Reference is made by FIGS. 7 and 8 to further illustrate a rotating manner of the hexagonal optical reflection element 200. FIG. 7 illustrates a perspective view of a hollow hexagonal cylinder 205 of a hexagonal optical reflection element 200 according to one embodiment of the present disclosure. FIG. 8 illustrates a schematic diagram illustrating the rotation of the hollow hexagonal cylinder 205 of the hexagonal optical reflection element 200 to the first position 205A, the second position 205B and the third position 205C according to one embodiment of the present disclosure.

In FIG. 7, the hollow hexagonal cylinder 205 of the hexagonal optical reflection element 200 is formed by six sidewalls connected to each other sequentially, wherein the six sidewalls include the first sidewall S1, the second sidewall S2, the third sidewall S3, the fourth sidewall S4, fifth sidewall S5 and the sixth sidewall which are sequentially connected to each other. In this embodiment, each of the first sidewall S1, the second sidewall S2, the third sidewall S3, the fourth sidewall S4, the fifth sidewall S5 and the sixth sidewall S6 is a rectangle, and the first sidewall S1, the second sidewall S2, the third sidewall S3, the fourth sidewall S4, the fifth sidewall S5 and the sixth sidewall S6 have the same shapes.

Referring to FIGS. 3 and 8 at the same time, the hexagonal optical reflection element 200 is located at the first position 205A, and the first sidewall S1 of the hexagonal optical reflection element 200 faces the picture generation unit 110. The hollow hexagonal cylinder 205 of the hexagonal optical reflection element 200 has an axis O, and the hollow hexagonal cylinder 205 is configured to rotate along a rotating shaft AX cross the axis O and parallel to the first sidewall S1, the second sidewall S2, the third sidewall S3, the fourth sidewall S4, the fifth sidewall S5 and the sixth sidewall S6.

Referring to FIGS. 4 and 8 at the same time, when the hexagonal optical reflection element 200 is located at the first position 205A, the hexagonal optical reflection element 200 can be rotated to the second position 205B by rotating 60 degrees clockwise along the rotating shaft AX. The second sidewall S2 faces the picture generation unit 110.

Referring to FIGS. 5-6 and 8 at the same time, when the hexagonal optical reflection element 200 is located at the second position 205B, the hexagonal optical reflection element 200 can be rotated to the third position 205C by rotating 60 degrees clockwise along the rotating shaft AX. The third sidewall S3 faces the picture generation unit 110.

Therefore, without occupying additional space, the light path of the light L1 projected by the picture generation unit 110 can be switched by rotating the hexagonal optical reflection element 200 to control the magnification of the head-up display 100. In some embodiments, the hexagonal optical reflection element 200 can be rotated by an electronically controlled rotating structure. For example, the hexagonal optical reflection element 200 can be fixed on the electronically controlled rotation mechanism, the electronically controlled rotation mechanism has a rotation shaft, and rotation shaft of the electronically controlled rotation mechanism passes through the axis O of the hollow hexagonal cylinder 205 of the hexagonal optical reflection element 200, so that the rotation shaft of the electronically controlled rotating mechanism is aligned with the rotation shaft AX of the hollow hexagonal cylinder 205. As such, the hollow hexagonal cylinder 205 of the hexagonal optical reflection element 200 can be rotated between the first position 205A, the second position 205B and the third position 205C along the rotation shaft AX by the electronically controlled rotating mechanism. In some embodiments, the electronically controlled rotating mechanism may include an electronically controlled motor connected to the rotating shaft of the electronically controlled rotating mechanism and/or a gear engaged with the rotating shaft of the electronically controlled rotating mechanism.

In one or more exemplary embodiments of the present disclosure, the hexagonal optical reflection element 200 is substantially one of the even-numbered-sidewalls optical reflection structures. In this embodiment, the hexagonal optical reflection element 200 has six sidewalls, which can provide three different light path configurations.

In some embodiments, an optical reflection structure can have different even number of sidewalls with respect to the hexagonal optical reflection structure 200. For example, the optical reflection structure can include a plurality of sidewalls connected to each other to form a closed hollow cylinder, and the number of sidewalls of the optical reflection structure is an even number, which is greater than or equal to four.

Taking an even-numbered-sidewalls optical reflection structure having a number of sidewalls greater than or equal to six as an example, the sidewalls of the even-numbered-sidewalls optical reflection structure include a first sidewall, a second sidewall, a third sidewall, a fourth sidewall and a fifth sidewall. The first sidewall has an optical reflection surface. The second sidewall is connected to the first sidewall and has a first optical transmission surface. The third sidewall is connected to the second sidewall and has a second optical transmission surface. The fourth sidewall is parallel to the second sidewall, wherein the fourth sidewall has a first optical reflection surface aligned with the second sidewall in the closed hollow cylinder. The fifth sidewall is parallel to the third sidewall, wherein the fifth sidewall has a second optical reflection surface aligned with the third sidewall in the closed hollow cylinder. In such embodiment, the even-numbered-sidewalls optical reflection structure can contain the light path structure configurations similar to three different light path lengths of the first position 205A, the second position 205B and the third position 205C as illustrated in the hexagonal optical reflection element 200, and the even-numbered-sidewalls optical reflection structure can further include other suitable reflections light path configurations.

In some embodiments, these even-numbered-sidewalls optical reflection structures can be further applied to head-up displays in a limited space to provide a greater number of light path structure configurations for users to choose from.

In summary, the present disclosure provides a head-up display and even-numbered-sidewalls optical reflection structure used for head-up displays. The even-numbered-sidewalls optical reflection structure is, for example, a hexagonal optical reflection element. By applying the hexagonal optical reflection element to the head-up display, various light path structures with different light path lengths can be provided in a limited space to present the image projected on the image display plate. The user can rotate the hexagonal optical reflective element to switch different display modes of the light path configurations of the head-up display based on the requirements of the field of vision and the viewing angle of the virtual image for the user.

Although the present disclosure has been described in considerable detail with reference to certain embodiments thereof, other embodiments are possible. Therefore, the spirit and scope of the appended claims should not be limited to the description of the embodiments contained herein. In view of the foregoing, it is intended that the present disclosure cover modifications and variations of this invention provided they fall within the scope of the following claims.

What is claimed is:

1. A head-up display, comprising:
a picture generation unit configured to project image light;
a hexagonal optical reflection element arranged on a light path of the image light, wherein the hexagonal optical reflection element comprises:
a hollow hexagonal cylinder having a first sidewall, a second sidewall, a third sidewall, a fourth sidewall, a fifth sidewall and a sixth sidewall which are sequentially connected to form a closed hexagonal column, wherein the second sidewall is transparent, and the first sidewall and the fifth sidewall opposite to the second sidewall are configured to reflect the image light;
a concave mirror disposed on the light path of the image light and configured to receive the image light reflected from the hollow hexagonal cylinder; and
an image display plate configured to receive image light reflected from the concave mirror.

2. The head-up display of claim 1, wherein:
the hollow hexagonal cylinder of the hexagonal optical reflection element is configured to rotate between a first position and a second position;
when the hollow hexagonal cylinder is at the first position, the first sidewall is aligned with the light path of the image light; and
when the hollow hexagonal cylinder is at the second position, the second sidewall and the fifth sidewall are aligned with the light path of the image light.

3. The head-up display of claim 1, wherein the hexagonal optical reflection element further comprises:
a half-wave plate located between the second sidewall and the fifth sidewall.

4. The head-up display of claim 1, wherein the hexagonal optical reflection element further comprises:
a quarter-wave plate located between the second sidewall and the fifth sidewall; and
a reflective polarizer formed on the second sidewall.

5. The head-up display of claim 1, wherein:
the third sidewall is transparent, and the sixth sidewall opposite to the third sidewall and connected to the first sidewall is configured to reflect the image light;
the hollow hexagonal cylinder of the hexagonal optical reflection element is configured to rotate between a first position, a second position and a third position;
when the hollow hexagonal cylinder is at the first position, the first sidewall is aligned with the light path of the image light;
when the hollow hexagonal cylinder is at the second position, the second sidewall and the fifth sidewall are aligned with the light path of the image light; and
when the hollow hexagonal cylinder is at the third position, the third sidewall and the sixth sidewall are aligned with the light path of the image light.

6. The head-up display of claim 5, wherein the hexagonal optical reflection element further comprises:

a half-wave plate located between the second sidewall and the fifth sidewall;

a quarter-wave plate located between the third sidewall and the sixth sidewall; and a reflective polarizer formed on the third sidewall.

7. The head-up display of claim 6, wherein a distance between the half-wave plate and the fifth sidewall is less than a distance between the half-wave plate and the second sidewall, a distance between the quarter-wave plate and the third sidewall is less than a distance between the quarter-wave plate and the sixth sidewall.

8. The head-up display of claim 1, wherein the picture generation unit comprises a linearly polarized light source.

9. The head-up display of claim 1, wherein the hexagonal optical reflection element further comprises:

a polarizing beam splitter disposed on at least one of the first sidewall and the second sidewall.

10. The head-up display of claim 1, wherein the hexagonal optical reflection element further comprises:

a reflection mirror disposed on the first sidewall of the hollow hexagonal cylinder and having a reflective curved surface protruding from the first sidewall.

11. The head-up display of claimed in claim 1, wherein the first sidewall, the second sidewall, the third sidewall, the fourth sidewall, the fifth sidewall and the sixth sidewall form an accommodating space, the hexagonal optical reflection element further comprises:

a reflection mirror located in the accommodating space and disposed on the fifth sidewall, wherein the reflection mirror has a reflective curved surface protruding toward the second sidewall.

12. The head-up display of claim 1, wherein the closed hexagonal column is a regular hexagon over a plane which is perpendicular to the first sidewall, the second sidewall, the third sidewall, the fourth sidewall, the fifth sidewall and the sixth sidewall.

13. The head-up display of claim 1, wherein the hexagonal optical reflection element further comprises:

an electronically controlled rotating mechanism having a rotating shaft, wherein the hollow hexagonal cylinder is fixed on the electronically controlled rotating mechanism, and the rotating shaft of the electronically controlled rotating mechanism is aligned with an axis of the hollow hexagonal cylinder.

14. The head-up display of claim 1, wherein the image display plate is transparent.

15. An optical reflection structure, comprising:

a plurality of sidewalls connected to each other to form a closed hollow cylinder, wherein a number of the sidewalls is an even number, and the sidewalls comprises:

a first sidewall having an optical reflection surface;

a second sidewall connected to the first sidewall and having a first optical transmission surface;

a third sidewall connected to the second sidewall and having a second optical transmission surface;

a fourth sidewall being parallel to the second sidewall, wherein the fourth sidewall has a first optical reflection surface aligned with the second sidewall in the closed hollow cylinder; and a fifth sidewall being parallel to the third sidewall, wherein the fifth sidewall has a second optical reflection surface aligned with the third sidewall in the closed hollow cylinder.

16. The optical reflection structure of claim 15, further comprising:

a half-wave plate located between the second sidewall and the fourth sidewall;

a quarter-wave plate located between the third sidewall and the fifth sidewall; and a reflective polarizer is formed on the third sidewall.

17. The optical reflection structure of claim 16, wherein a distance between the half-wave plate and the fourth sidewall is less than a distance between the half-wave plate and the second sidewall, and a distance between the quarter-wave plate and the third sidewall is less than a distance between the quarter-wave plate and the fifth sidewall.

18. The optical reflection structure of claim 15, further comprising:

a polarizing beam splitter disposed on at least one of the sidewalls.

19. The optical reflection structure of claim 15, further comprising:

an electronically controlled rotating mechanism having a rotating shaft, wherein the closed hollow cylinder is fixed on the electronically controlled rotating mechanism, and the rotating shaft of the electronically controlled rotating mechanism is aligned with an axis of the closed hollow cylinder.

20. The optical reflection structure of claim 15, wherein the closed hollow cylinder is a closed regular polygon on a plane perpendicular to the sidewalls.

\* \* \* \* \*